(12) United States Patent
Hwang et al.

(10) Patent No.: US 12,217,003 B2
(45) Date of Patent: Feb. 4, 2025

(54) APPARATUS AND METHOD FOR PROCESSING NATURAL LANGUAGE

(71) Applicant: SAMSUNG SDS CO., LTD., Seoul (KR)

(72) Inventors: Bong-Kyu Hwang, Seoul (KR); Ju-Dong Kim, Seoul (KR); Jae-Woong Yun, Seoul (KR); Hyun-Jae Lee, Seoul (KR); Hyun-Jin Choi, Seoul (KR); Seong-Ho Joe, Seoul (KR); Young-June Gwon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 323 days.

(21) Appl. No.: 17/863,742

(22) Filed: Jul. 13, 2022

(65) Prior Publication Data
US 2023/0081042 A1 Mar. 16, 2023

(30) Foreign Application Priority Data
Sep. 8, 2021 (KR) .......................... 10-2021-0119688

(51) Int. Cl.
| | |
|---|---|
| G06F 40/205 | (2020.01) |
| G06F 16/35 | (2019.01) |
| G06F 40/117 | (2020.01) |
| G06F 40/221 | (2020.01) |
| G06F 40/284 | (2020.01) |
| G06F 40/279 | (2020.01) |
| G06F 40/295 | (2020.01) |
| G10L 15/18 | (2013.01) |
| G10L 15/183 | (2013.01) |

(52) U.S. Cl.
CPC ............ *G06F 40/284* (2020.01); *G06F 16/35* (2019.01); *G06F 40/117* (2020.01); *G06F 40/205* (2020.01); *G06F 40/221* (2020.01); *G06F 40/279* (2020.01); *G06F 40/295* (2020.01); *G10L 15/18* (2013.01); *G10L 15/1815* (2013.01); *G10L 15/183* (2013.01)

(58) Field of Classification Search
None
See application file for complete search history.

(56) References Cited

U.S. PATENT DOCUMENTS

| | | | |
|---|---|---|---|
| 7,325,187 B2 * | 1/2008 | Yashiro | G06F 40/154 |
| | | | 715/234 |
| 9,477,756 B1 * | 10/2016 | Park | G06F 16/353 |
| 9,483,740 B1 * | 11/2016 | Ansel | G06F 40/284 |
| 10,235,358 B2 * | 3/2019 | Tur | G06F 40/30 |

(Continued)

FOREIGN PATENT DOCUMENTS

KR 10-2264899 B1 6/2021

*Primary Examiner* — Richard Z Zhu
(74) *Attorney, Agent, or Firm* — Sughrue Mion, PLLC

(57) ABSTRACT

An apparatus for processing natural language according to an embodiment includes a collection module that collects documents having tags, a parsing module that extracts text from the collected documents and extracts tag-related information on the tag surrounding each extracted text, and a preprocessing module that generates tokens of a preset unit by tokenizing each extracted text, generates token position information for each token in full text of the document, and sets the token and the token position information as training data in matching with the tag-related information.

12 Claims, 8 Drawing Sheets

(56) References Cited

U.S. PATENT DOCUMENTS

| | | | |
|---|---|---|---|
| 10,956,659 B1* | 3/2021 | Wexler | G06F 40/186 |
| 10,990,645 B1* | 4/2021 | Shi | G06N 3/045 |
| 11,048,881 B2* | 6/2021 | Chittimalli | G06N 20/00 |
| 11,264,025 B2* | 3/2022 | Kessler | G10L 15/30 |
| 2011/0004462 A1* | 1/2011 | Houghton | G10L 15/183 |
| | | | 704/E15.005 |
| 2011/0282877 A1* | 11/2011 | Gazen | G06F 16/355 |
| | | | 707/E17.089 |
| 2022/0108079 A1* | 4/2022 | Roisman | G06F 40/154 |
| 2023/0222285 A1* | 7/2023 | Zhang | G06F 16/483 |
| | | | 715/255 |

* cited by examiner

FIG. 2

```
← → C  ⓘ  FILE | D:/2021/PATENT ANALYSIS/example.html
```

VOLUNTEER WORK

TO DO THINGS FOR THE BENEFIT OF SOCIETY OR THE PUBLIC OF ONE'S OWN WILL.

SOMETIMES THIS TYPE OF VOLUNTEER WORK IS CALLED OFFICIAL VOLUNTEER WORK.

DETAILS OF VOLUNTEER WORK

- VISITING ORPHANAGE
- VISITING SENIOR CITIZENS CENTER

VOLUNTEER PERSONNEL

| NAME | AGE |
|---|---|
| LEE Jeong-Yoon | 27 |
| KIM Ga-Young | 20 |
| KIM Min-Joo | 23 |

FIG. 3

```html
<html lang="ko" dir="ltr">
<head>
<meta charset="UTF-8">
<title>volunteer work - wikipedia, the encyclopedia of all of us</title>
</head>
<body>
<div>
  <h3>volunteer work</h3>
  <p>to do things for the benefit of society or the public of one's
     own will.</p>
  <p>sometimes this type of volunteer work is called official
     volunteer work.</p>
  <div>
    <p>details of volunteer work</p>
    <ul>
      <li>visiting orphanage</li>
      <li>visiting senior citizens center</li>
    </ul>
  </div>
  <div>
    <p>volunteer personnel</p>
    <table style="text-align:center" border="1">
    <tbody>
      <tr>
        <th>name</th>
        <th>age</th>
      </tr>
      <tr>
        <td>LEE Jeong-Yoon</td>
        <td>27</td>
      </tr>
      <tr>
        <td>KIM Ga-Young</td>
        <td>20</td>
      </tr>
      <tr>
        <td>KIM Min-Joo</td>
        <td>23</td>
      </tr>
    </tbody>
    </table>
  </div>
</div>
</body>
</html>
```

FIG. 4A

VOLUNTEER WORKTO DO THINGS FOR THE BENEFIT OF SOCIETY OR THE PUBLIC OF ONE'S OWN WILL. SOMETIMES THIS TYPE OF VOLUNTEER WORK IS CALLED OFFICIAL VOLUNTEER WORKDETAILS OF VOLUNTEER WORKVISITING ORPHANAGEVISITING SENIOR CITIZENS CENTER VOLUNTEER PERSONNELNAMEAGELEE Jeong-Yoon27KIM Ga-Young20 KIM Min-Joo23

FIG. 4B

| Tag Attribute Information | Structural Position Information |
|---|---|
| `<div>` | Depth : 0 |
| `<h6>` | Depth : 0, RP : 0 |
| `<p>` | Depth : 0, RP : 1 |
| `<p>` | Depth : 0, RP : 2 |
|     `<div>` | Depth : 1 |
|     `<p>` | Depth : 1, RP : 0 |
|     `<table>` | Depth : 2 |
|         `<th>` | Depth : 2, RP : 0 |
|         `<td>` | Depth : 2, RP : 1 |
|         `<td>` | Depth : 2, RP : 2 |
|     `<p>` | Depth : 1, RP : 1 |
|     `<ol>` | Depth : 2 |
|         `<li>` | Depth : 2, RP : 0 |
|         `<li>` | Depth : 2, RP : 1 |
|     `</div>` | Depth : 1 |
| `<p>` | Depth : 0, RP : 3 |
| `</div>` | Depth : 0 |

[TAG ATTRIBUTE INFORMATION]      [STRUCTURAL POSITION INFORMATION]

FIG. 5

| Text | VOLUNTEER WORK | TO DO THINGS FOR THE BENEFIT OF SOCIETY OR THE PUBLIC OF ONE'S OWN WILL. | SOMETIMES THIS TYPE OF VOLUNTEER WORK IS CALLED OFFICIAL VOLUNTEER WORK. |
|---|---|---|---|
| Tag | H3 | P | P |
| RP | 0 | 1 | 2 |

| Text | DETAILS OF VOLUNTEER WORK | VISITING ORPHANAGE | VISITING SENIOR CITIZENS CENTER | VOLUNTEER PERSONNEL | NAME | AGE | LEE Jeong-Yoon | 27 | KIM Ga-Young | 20 | KIM Min-Joo | 23 |
|---|---|---|---|---|---|---|---|---|---|---|---|---|
| Tag | P | L | L | P | TH | TH | TD | TD | TD | TD | TD | TD |
| RP | 0 | 0 | 1 | 0 | 0 | 0 | 1 | 1 | 2 | 2 | 3 | 3 |

APPARATUS AND METHOD FOR PROCESSING NATURAL LANGUAGE

CROSS-REFERENCE TO RELATED APPLICATION AND CLAIM OF PRIORITY

This application claims the benefit under 35 USC § 119 of Korean Patent Application No. 10-2021-0119688, filed on Sep. 8, 2021, in the Korean Intellectual Property Office, the entire disclosure of which is incorporated herein by reference for all purposes.

BACKGROUND

1. Field

The disclosed embodiments relate to technologies for processing natural language.

2. Description of Related Art

In computer science, natural language understanding (NLU) means that a computer receives a sentence composed of a natural language (e.g., Korean, Japanese, English, etc.) that humans generally use for communication, and infers intention of the input sentence. There are various technologies for understanding natural language on a computer, but recently, technologies using a machine learning-based artificial intelligence model have been mainly studied.

Meanwhile, a large amount of text data is required to train a machine learning-based NLU model. Accordingly, conventionally, after securing a large amount of hypertext markup language (HTML) documents through web crawling, all HTML tag information was removed and only text information was parsed and used to train the NLU model.

The training data generated in this way helps to train a model that can understand natural language, but with this training data, it is impossible to know about a structural relationship between the sentences that make up the HTML document and the sentences. In addition, when a model trained by extracting only text data from the HTML document is used for HTML document analysis, structural information that makes up a web page cannot be utilized, and thus, there is a problem that analysis performance is significantly degraded.

SUMMARY

The disclosed embodiments are intended to provide an apparatus and method for processing natural language that enables understanding not only text content of a document but also a structure within the document.

An apparatus for processing natural language according to an embodiment includes a collection module that collects documents having tags, a parsing module that extracts text from the collected documents and extracts tag-related information on the tag surrounding each extracted text, and a preprocessing module that generates tokens of a preset unit by tokenizing each extracted text, generates token position information for each token in full text of the document, and sets the token and the token position information as training data in matching with the tag-related information.

The tag-related information may include tag attribute information of the tag in which each text is positioned and structural position information of the corresponding tag.

The structural position information of the tag may include depth information and relative position information of the corresponding tag.

The depth information may be information indicating a depth level of the corresponding tag, and the parsing module may assign the depth level to the corresponding tag according to whether or not a higher-level tag or a lower-level tag for the corresponding tag exists.

The parsing module may assign a relative position information value to the tags having the same depth level according to a relative position or order.

The preprocessing module may set the token and the token position information as the training data in matching with the tag attribute information and the relative position information.

The apparatus for processing natural language may further include a machine learning module including a natural language understanding (NLU) model, receiving the training data from the preprocessing module, and training the NLU model using the training data.

The machine learning module may train the NLU model by assigning a weight to each tag among the training data.

A method for processing natural language according to another embodiment is a method performed by a computing device that includes one or more processors and a memory for storing one or more programs executed by the one or more processors, the method including collecting documents having tags, extracting text from the collected documents and extracting tag-related information on the tag surrounding each extracted text, generating tokens of a preset unit by tokenizing each extracted text, generating token position information for each token in full text of the document, and setting the token and the token position information as training data by matching in matching with the tag-related information.

The tag-related information may include tag attribute information of the tag in which each text is positioned and structural position information of the corresponding tag.

The structural position information of the tag may include depth information and relative position information of the corresponding tag.

The depth information may be information indicating a depth level of a corresponding tag, and the extracting of the tag-related information may include assigning the depth level according to whether or not a higher-level tag or a lower-level tag for the corresponding tag exists.

The extracting of the tag-related information may further include assigning a relative position information value to the tags having the same depth level according to a relative position or order.

In the setting of the token and the token position information as the training data, the token and the token position information may be set as the training data in matching with the tag attribute information and the relative position information.

The method for processing natural language may further include training a natural language understanding (NLU) model by inputting the training data into the NLU model.

In the training of the NLU model, the NLU model may be trained by assigning a weight to each tag among the training data.

According to the disclosed embodiments, as the token and token position information generated for each text, as well as the tag attribute information and tag relative position information are included in the training data, the NLU model can be trained to understand not only content of the HTML document but also the structure of the HTML document (structural relationship between tokens) when the NLU model understands the HTML document.

In addition, the NLU model trained using training data that additionally includes the tag attribute information and relative position information of the tag can be utilized for services that require structural understanding of the document, and in that case, analysis performance can be improved while reducing the processing time.

BRIEF DESCRIPTION OF THE DRAWINGS

FIG. 2 is a diagram illustrating an example of a web page that is a target of web crawling in an embodiment of the present disclosure.

FIG. 3 is a view illustrating an HTML document corresponding to the web page of FIG. 2.

FIGS. 4A and 4B are diagrams illustrating a state in which a parsing module extracts text and tag-related information from the HTML document in an embodiment of the present disclosure.

FIG. 5 is a diagram illustrating a state in which the parsing module according to an embodiment of the present disclosure makes each text match with tag-related information corresponding thereto.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies related to the present disclosure may unnecessarily obscure the subject matter of the present disclosure, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

Figure 1:
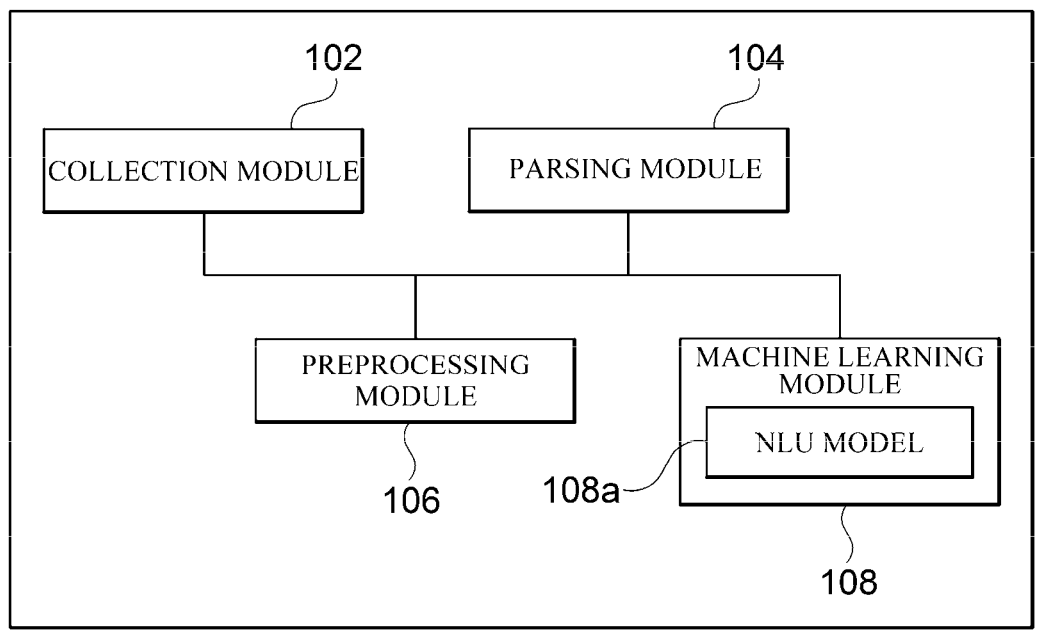
FIG. 1 is a block diagram illustrating a configuration of an apparatus for processing natural language based on a tag according to an embodiment of the present disclosure.

FIG. 1 is a block diagram illustrating a configuration of an apparatus for processing natural language based on a tag according to an embodiment of the present disclosure.

Referring to FIG. 1, an apparatus 100 for processing natural language may include a collection module 102, a parsing module 104, a preprocessing module 106, and a machine learning module 108. Here, the machine learning module 108 may include a machine learning-based natural language understanding (NLU) model 108a.

The apparatus 100 for processing natural language may be an apparatus for performing natural language processing on a document having a tag. Hereinafter, an example in which the apparatus 100 for processing natural language performs natural language processing on a hypertext markup language (HTML) document will be described as an example, but is not limited thereto. It goes without saying that the apparatus 100 for processing natural language may target various types of documents (e.g., extensible Markup Language (XML), etc.) having tags other than the HTML document as objects to be subjected to natural language processing.

The collection module 102 may collect documents having tags (e.g., HTML documents, etc.). In this case, the collected documents may be used to train the NLU model. In an exemplary embodiment, the collection module 102 may collect a large amount of HTML documents through web crawling. Specifically, the collection module 102 may collect various uniform resource locators (URLs), access each URL through a communication network, and collect the HTML document that makes up a web page of the corresponding URL. The collection module 102 may store the collected HTML document.

FIG. 2 is a diagram illustrating an example of a web page that is a target of web crawling in an embodiment of the present disclosure and FIG. 3 is a diagram illustrating an HTML document corresponding to the web page of FIG. 2. Referring to FIGS. 2 and 3, the HTML document includes not only text data, but also tag information that makes up HTML, and program codes such as various kinds of JavaScript that allow the HTML document to perform a function of the web page.

Here, a tag is a grammatical mark that makes up the HTML document, and consists of angle brackets (<keyword>) that enclose a keyword indicating an attribute of the corresponding tag. And, most HTML elements are written with a start tag and an end tag, and content thereof is placed between the start tag and the end tag. In this case, the end tag is distinguished from the start tag by putting a slash (</keyword>) in the angle brackets.

Table 1 is a table illustrating pieces of main tag information of the HTML document.

TABLE 1

| Tag Attributes | Tag Information |
| --- | --- |
| <h1> ~ <h6> | indicates title of the compartment |
| <p> | makes up one paragraph |
| <div> | used to group contents making up HTML for a certain purpose |
| <ul> | indicates an unordered list |
| <ol> | indicates an ordered list |
| <li> | indicates one element of a list |
| <tr> | indicates one row in the table |
| <th> | indicates head of the table |
| <td> | indicates data cell of the table |

The parsing module 104 may parse a document (e.g., an HTML document, etc.) collected by the collection module 102. In an exemplary embodiment, the parsing module 104 may extract text from the HTML document. In addition, the parsing module 104 may extract tag-related information about a tag enclosing each text from the HTML document. In this case, the parsing module 104 may extract tag attribute information (i.e., information about which tag the corresponding text is positioned in) of the tag in which each text is positioned and structural position information (i.e., information about where the corresponding tag is positioned within the structure of the HTML document) of the corresponding tag.

FIGS. 4A and 4B are diagrams illustrating a state in which the parsing module 104 extracts text and tag-related information from the HTML document in an embodiment of the present disclosure. Referring to FIGS. 4A and 4B, the parsing module 104 may extract only text from the HTML document (FIG. 4A). In addition, the parsing module 104 may extract tag-related information for the tag enclosing each text of the HTML document. The tag-related information may include the tag attribute information and structural position information of the corresponding tag (FIG. 4B).

Here, the structural position information of the tag may include depth information and relative position (RP) information. The depth information is information indicating a depth level of the corresponding tag, and the depth level varies depending on whether the corresponding tag has a higher-level tag or a lower-level tag. The depth level may increase as the tag has more higher-level tags.

That is, if there is no higher-level tag in the corresponding tag, the depth level of the corresponding tag may be 0. If the corresponding tag has a higher-level tag, the depth level of the corresponding tag may be 1. If the corresponding tag has a higher-level tag, and the higher-level tag has another higher-level tag, the depth level of the corresponding tag may be 2.

In addition, the relative position information may be information indicating a relative position or order between tags having the same depth level. For example, in FIG. 4B, each of <th>, <td>, and <td> corresponding to the lower-level tags of <table> has a depth level of 2, and 0, 1, and 2 may be assigned as relative position information values of <th>, <td>, and <td> according to their relative positions or order, respectively. In addition, in FIG. 4B, each of <li> and <li> corresponding to the lower-level tags of <ol> has a depth level of 2, and 0 and 1 may be assigned as relative position information values of <li> and <li> according to their relative positions or order, respectively.

The parsing module 104 may store each extracted text and tag-related information in matching with each other. FIG. 5 is a diagram illustrating a state in which the parsing module 104 according to an embodiment of the present disclosure makes each text match with tag-related information corresponding thereto.

The preprocessing module 106 may perform preprocessing on each text extracted by the parsing module 104. That is, the preprocessing module 106 may preprocess each text extracted by the parsing module 104 into a form that can be learned by the machine learning module 108 and input the preprocessed each text to the machine learning module 108.

Specifically, the preprocessing module 106 may generate tokens of a preset unit by performing tokenization on each text. For example, the preprocessing module 106 may generate tokens in units of morphemes by performing morpheme analysis on each text. Here, although it has been described that the preprocessing module 106 tokenizes each text in units of morphemes, the present disclosure is not limited thereto, and tokenization may be performed in units of syllables, or tokenization may be performed in other preset units.

The preprocessing module 106 may generate information (i.e., token position information) about the position of each token in the entire text of the HTML document. That is, the preprocessing module 106 may generate, for each token, token position information indicating information about where each token is positioned in the entire text of the HTML document. The token position information may include a predetermined value according to the position or order that the corresponding token occupies in the entire text of the HTML document.

The preprocessing module 106 may store the token, token position information, and tag-related information generated for each text in matching with one another. Here, the token, token position information, and tag-related information generated for each text may be used as training data of the machine learning module 108.

Figure 6:
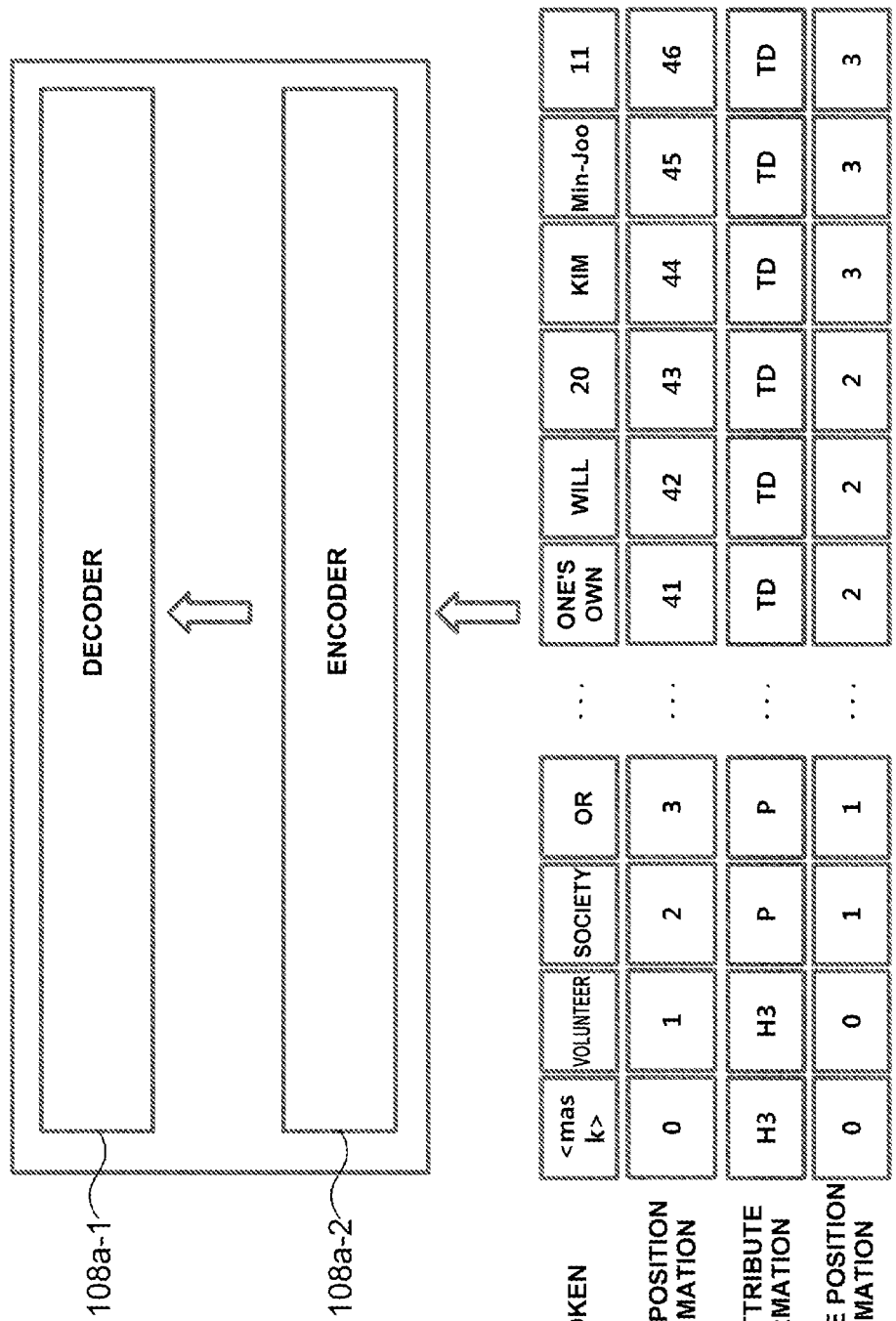
FIG. 6 is a diagram illustrating a state in which training data is input to an NLU model in an embodiment of the present disclosure.

The machine learning module 108 may receive the training data from the preprocessing module 106 to train the NLU model 108a. For example, the NLU model 108a may be an artificial neural network model for summarizing an HTML document, but is not limited thereto, and may be a model having various other purposes. FIG. 6 is a diagram illustrating a state in which the training data is input to the NLU model 108a in an embodiment of the present disclosure. In an exemplary embodiment, the NLU model 108a may have a structure including, but not limited to, an encoder 108a-1 and a decoder 108a-2.

Referring to FIG. 6, the training data may include the token and token position information generated for each text, tag attribute information, and relative position information of the tag. Here, the training data may include only the relative position information of the tag among the structural position information of the tag. That is, since the relative position information of the tag is information indicating the relative position or order between tags having the same depth level, the depth information of the tag may be deleted.

When learning using the training data in the NLU model 108a, training may be performed by giving a different weight to each tag of the HTML document and varying the importance of each tag.

According to the disclosed embodiments, as the token and token position information generated for each text, as well as tag attribute information and relative position information of the tag are included in the training data, the NLU model can be trained to understand not only content of the HTML document but also the structure of the HTML document (structural relationship between tokens) when the NLU model understands the HTML document.

In addition, the NLU model trained using training data that additionally includes tag attribute information and tag relative position information can be utilized for services that require structural understanding of the document, and in that case, analysis performance can be improved while reducing processing time.

In this specification, a module may mean a functional and structural combination of hardware for carrying out the technical idea of the present disclosure and software for driving the hardware. For example, the "module" may mean a logical unit of a predetermined code and a hardware resource for executing the predetermined code, and does not necessarily mean physically connected code or a single type of hardware.

Figure 7:
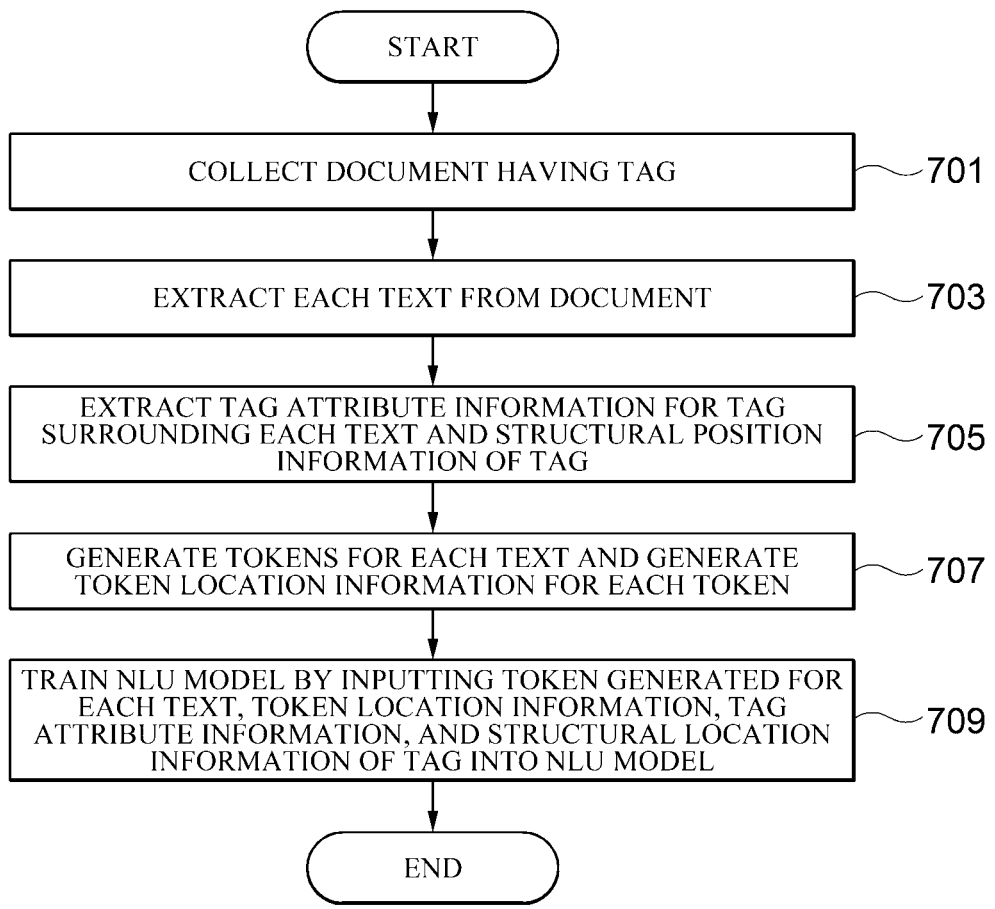
FIG. 7 is a flowchart illustrating a method for processing natural language based on a tag according to an embodiment of the present disclosure.

FIG. 7 is a flowchart illustrating a method for processing natural language based on a tag according to an embodiment of the present disclosure.

The method illustrated in FIG. 7 may be performed by, for example, the apparatus 100 for processing natural language illustrated in FIG. 1.

Referring to FIG. 7, the apparatus 100 for processing natural language collects documents having tags (701).

In an exemplary embodiment, the apparatus 100 for processing natural language may collect documents having tags, such as the HTML document, through web crawling.

After that, the apparatus 100 for processing natural language extracts each text from the collected document (703).

In this case, the apparatus 100 for processing natural language may use a known technique for extracting text from a document.

After that, the apparatus 100 for processing natural language extracts tag attribute information for a tag enclosing each text and structural position information of the tag (705).

Here, the structural location information of the tag may include depth information and relative position (RP) information of the corresponding tag.

In addition, the apparatus 100 for processing natural language may store each extracted text, tag attribute information corresponding thereto, and structural location information of the tag in matching with one another.

After that, the apparatus 100 for processing natural language generate tokens of a preset unit by performing tokenization on each text, and generates token location information for each token from the entire text of the collected document (707).

After that, the apparatus 100 for processing natural language trains the NLU model 108a by inputting the token and token location information generated for each text, tag attribute information, and structural location information of the tag into the NLU model 108a (709)

Meanwhile, in the flowchart illustrated in FIG. 7, the method has been described by dividing the method into a plurality of steps, but at least some of the steps are performed in a different order, performed together in combination with other steps, omitted, performed by being divided into sub-steps, or performed by being added with one or more steps (not illustrated).

Figure 8:
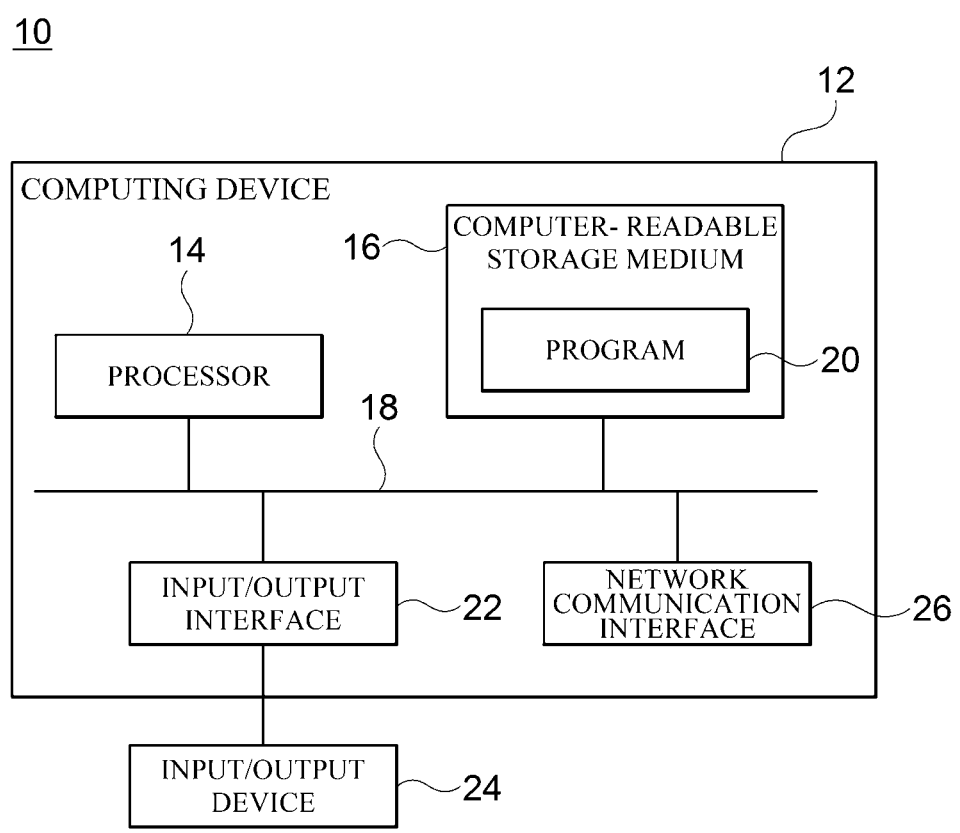
FIG. 8 is a block diagram illustratively describing a computing environment including a computing device suitable for use in example embodiments.

FIG. 8 is a block diagram illustratively describing a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In an embodiment, the computing device 12 may be the apparatus 100 for processing natural language.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Although representative embodiments of the present disclosure have been described in detail, those skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. An apparatus for processing natural language comprising:
   at least one memory configured to store program code; and
   at least one processor configured to read the program code and operate as instructed by the program code to perform:
   collecting documents having tags;
   extracting text from the collected documents and extracting tag-related information on a tag surrounding each extracted text; and
   generating tokens of a preset unit by tokenizing each extracted text, generating token position information for each token in full text of a document, and setting the token and the token position information as training data in matching with the tag-related information,
   wherein the tag-related information includes structural position information of a tag in which each text is positioned,
   wherein the structural position information of the tag includes depth information and relative position information of a corresponding tag, wherein the depth information is information indicating a depth level of the corresponding tag, wherein the relative position information includes a relative position information value that is assigned to tags having the same depth level to sequentially increase or decrease according to a relative position or order between the tags having the same depth level, and wherein relative position information values of two adjacent tags having different depth levels do not represent a relative position or order between the two adjacent tags.

2. The apparatus of claim 1, wherein the tag-related information further includes tag attribute information of the corresponding tag.

3. The apparatus of claim 2,
wherein, in the extracting the tag-related information, the at least one processor is further configured to operate as instructed by the program code to assign the depth level to the corresponding tag according to whether or not a higher-level tag or a lower-level tag for the corresponding tag exists.

4. The apparatus of claim 2, wherein, in the setting the token and the token position information, the at least one processor is further configured to operate as instructed by the program code to set the token and the token position information as the training data in matching with the tag attribute information and the relative position information.

5. The apparatus of claim 4, wherein the at least one processor is further configured to operate as instructed by the program code to:
train a natural language understanding (NLU) model using the training data.

6. The apparatus of claim 5, wherein the at least one processor is further configured to operate as instructed by the program code to train the NLU model by assigning a weight to each tag among the training data.

7. A method for processing natural language performed by a computing device that includes one or more processors and a memory for storing one or more programs executed by the one or more processors, the method comprising:
collecting documents having tags;
extracting text from the collected documents and extracting tag-related information on a tag surrounding each extracted text;
generating tokens of a preset unit by tokenizing each extracted text;
generating token position information for each token in full text of a document; and
setting the token and the token position information as training data by matching in matching with the tag-related information,
wherein the tag-related information includes structural position information of a tag in which each text is positioned,
wherein the structural position information of the tag includes depth information and relative position information of a corresponding tag,
wherein the depth information is information indicating a depth level of the corresponding tag,
wherein the relative position information includes a relative position information value that is assigned to tags having the same depth level to sequentially increase or decrease according to a relative position or order between the tags having the same depth level, and
wherein relative position information values of two adjacent tags having different depth levels do not represent a relative position or order between the two adjacent tags.

8. The method of claim 7, wherein the tag-related information further includes tag attribute information of the corresponding tag.

9. The method of claim 8, wherein
the extracting of the tag-related information includes assigning the depth level according to whether or not a higher-level tag or a lower-level tag for the corresponding tag exists.

10. The method of claim 8, wherein in the setting of the token and the token position information as the training data, the token and the token position information are set as the training data in matching with the tag attribute information and the relative position information.

11. The method of claim 10, further comprising:
training a natural language understanding (NLU) model by inputting the training data into the NLU model.

12. The method of claim 11, wherein in the training of the NLU model, the NLU model is trained by assigning a weight to each tag among the training data.

* * * * *